United States Patent [19]

Zimmer

[11] 4,358,941
[45] Nov. 16, 1982

[54] SECURITY METHOD AND APPARATUS

[76] Inventor: John C. Zimmer, 502 Estate Dr., New Iberia, La. 70560

[21] Appl. No.: 198,299

[22] Filed: Oct. 20, 1980

[51] Int. Cl.³ .................. E05B 67/36; F16B 21/12; F16B 39/06; F16B 41/00
[52] U.S. Cl. ........................... 70/229; 70/371; 70/230; 70/32; 285/80; 292/327; 411/209; 411/910
[58] Field of Search ............... 285/80; 70/230, 371, 70/14, 32–34, 175, 187, 229, 232, 6, 363; 292/327; 411/209, 294

[56] References Cited

U.S. PATENT DOCUMENTS

| 88,959 | 4/1869 | Hopkins | 292/327 |
|---|---|---|---|
| 193,741 | 7/1877 | Winslow | 292/327 |
| 305,052 | 9/1884 | Cragin | 411/209 |
| 1,515,919 | 11/1924 | Alvensleben | 70/230 X |
| 1,541,735 | 6/1925 | Oberg | 70/34 |
| 1,587,397 | 6/1926 | Menard | 411/209 |
| 1,640,840 | 8/1927 | Kotler | 70/230 |
| 1,689,403 | 10/1928 | Olson | 70/371 UX |
| 1,783,971 | 12/1930 | Miquet | 70/230 X |
| 1,928,879 | 10/1933 | Causey | 70/172 |
| 2,996,909 | 8/1961 | Raye | 70/371 X |
| 3,339,384 | 9/1967 | Greenwald | 70/363 |
| 3,600,912 | 8/1971 | Foreman | 70/230 X |

FOREIGN PATENT DOCUMENTS

| 378757 | 7/1923 | Fed. Rep. of Germany | 70/230 |
|---|---|---|---|
| 397072 | 6/1924 | Fed. Rep. of Germany | 70/34 |
| 62170 | 3/1940 | Norway | 411/294 |
| 122777 | 10/1927 | Switzerland | 70/371 |

Primary Examiner—Ramon S. Britts
Assistant Examiner—Carl F. Pietruszka
Attorney, Agent, or Firm—Guy E. Matthews

[57] ABSTRACT

Disclosed is a security device and method. The device includes a bolt having a first hole drilled radially therein, a second threaded hole drilled axially therein to intersect the first hole, and a third hole formed axially therein connecting the second hole with the end of the bolt. A bar is insertable into the first hole to extend radially outside the bolt thereby to prevent a nut from being removed from the bolt. The bar is secured in the bolt by means of a pick-proof lock that has a screw portion threadably engagable with the second hole to engage the bar, and a lock body configured to fit the third hole.

1 Claim, 3 Drawing Figures

SECURITY METHOD AND APPARATUS

BACKGROUND OF THE INVENTION

This invention relates to security devices and methods, and more particularly to devices and methods for securing nuts on bolts.

DESCRIPTION OF THE PRIOR ART

Producers of oil and gas wells are plagued with the problem of theft of production equipment from well heads. Production equipment is assembled to form a christmas tree and when the christmas tree is assembled with conventional nuts and bolts, a thief can quickly disassemble the equipment with adjustable wrenches. Considering not only the cost of replacing stolen production equipment, but also the loss of production and labor required to reinstall the equipment, oil field equipment theft is extremely costly.

In the past, a number of locking devices have been suggested to eliminate the theft of oil field equipment or at least deter thieves. Such devices have included complicated structures requiring special tools for assembly and disassembly. The devices are effective in deterring thieves because the thief normally does not have the specialized equipment necessary to disassemble the device. However, the prior art devices are not foolproof and may be disassembled if the thief has sufficient time, or if the thief knows the equipment of the device and has the special tools.

A more serious shortening of the devices of the prior art is that they are less effective for making up production equipment than are ordinary nuts and bolts. Also, even with the special tools, the prior devices are a nuisance to disassemble.

Accordingly, it is an object of the present invention to provide a method and apparatus for securing together equipment that can be assembled and disassembled quickly with conventional tools, but which, when locked, cannot be disassembled.

SUMMARY OF THE INVENTION

Briefly stated, the foregoing and other objects of the present invention are accomplished by providing a bolt having a first hole formed perpendicular to the axis of the bolt, a second threaded hole formed coaxially with the bolt to intersect the first hole, and a third hole formed coaxial with the bolt to connect the second hole to the end of the bolt. A bar is provided that is insertable into the first hole such that when inserted, one end thereof extends radially outside the bolt. A pick-resistant lock is provided that has a screw portion threadably engagable with the second hole in the bolt and a body portion that is configured to fit the third hole in the bolt. The end of the screw portion engages a notch in the bar, whereby when the device is assembled, the pick-resistant lock locks the bar in the first hole. When the device is assembled, a nut threaded onto the bolt may not be backed off past the bar.

DESCRIPTION OF THE PREFERRED EMBODIMENT

Figure 1:
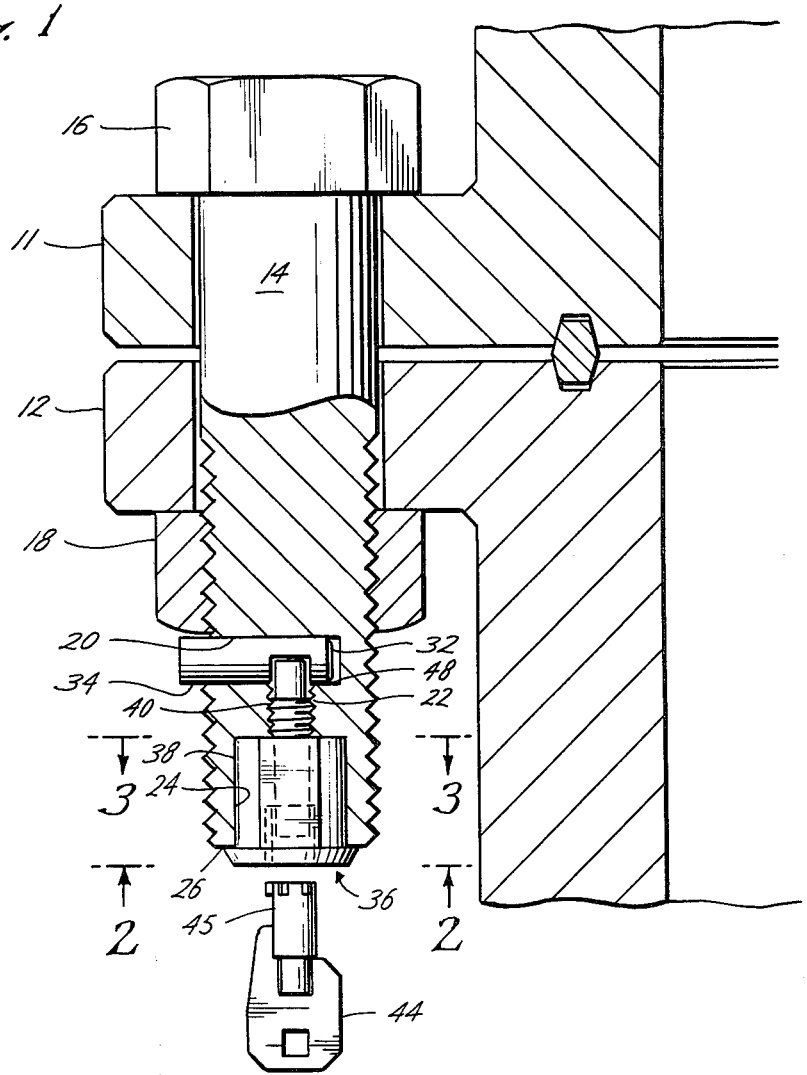
FIG. 1 is a partial sectional view of the device of the present invention.
Figure 2:
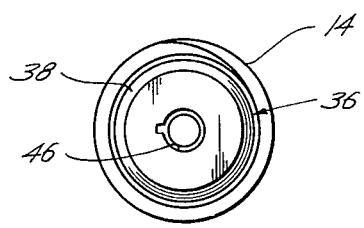
FIG. 2 is a view along line 2—2 of FIG. 1 showing arrangement of the pick-proof lock.

Referring now to the drawings, the device of the present invention is shown in FIG. 1 securing a pair of flanges 11 and 12. The device includes a bolt 14 having a head 16 and a nut 18 threaded thereon to make up flanges 11 and 12. Head 16 and nut 18 are of conventional configuration and have a plurality of flat surfaces in order that they may be made up with ordinary wrenches.

Figure 3:
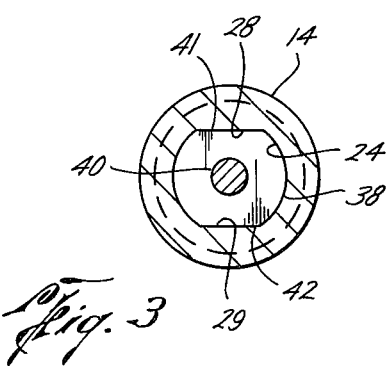
FIG. 3 is a sectional view along line 3—3 of FIG. 1 showing the arrangement of the pick-proof lock within the bolt of the device of the present invention.

Bolt 14 has formed therein a first hole 20. Hole 20 is formed by drilling, or the like, and extends into bolt 14 perpendicular to the axis thereof. Bolt 14 also has formed therein a threaded second hole 22. Second hole 22 is formed coaxially with bolt 14 and intersects first hole 20. Bolt 14 further has a third hole 24, which is formed coaxially with second hole 22 and connects second hole 22 with the end 26 of bolt 14. As shown in FIG. 3, third hole 24 includes a pair of flat sides 28 and 29.

First hole 20 is configured to receive a bar 32. Bar 32 is long enough such that one of its ends 34 extends radially outside bolt 14 to retain nut 18. Bar 32 is retained in first hole 20 by means of a pick-proof lock, designated generally by the numeral 36. Pick-resistant locks, which are sometimes called ACE locks, are generally available and include a lock body 38 and a screw 40. As shown in FIG. 3, lock body 38 this configured to fit into third hole 24 and has a pair of flat sides 41 and 42 such that when inserted into third hole 24 the lock body 38 can not be rotated.

Screw 40 is rotatable with respect to lock body 38 by means of a key 44. Key 44 has a cylindrical portion 45 that is insertable into a key hole 46 and has a plurality of key structures adapted to mate with and operate a locking mechanism within lock body, shown generally in phantom in FIG. 1, to rotate screw 40. Screw 40 is threadably engagable with second hole 22 and with a notch 48 in bar 34. Locks of the type of pick-resistant lock 36 are virtually impossible to pick. Therefore, when screw 40 is engaged with notch 48, bar 34 can not be removed from hole 20 without key 44, thereby making it impossible to back nut 18 off bolt 14.

In operation, holes 20, 22 and 24 are formed in bolt 14. Bolt 14 is then used to connect together flanges 11 and 12 by means of nut 18. Bolt 14 and nut 18 can be tightened to make up flanges 11 and 12 as tightly as described with ordinary wrenches. After flanges 11 and 12 have been made up, bar 34 is inserted into hole 20 such that notch 48 is coincident with hole 22, whereupon a pick-resistant lock 36 is inserted into holes 22 and 24. Key 44 is inserted into keyhole 46 and rotated to advance screw 40 into hole 22, eventually to engage notch 48 of bar 34. When screw 40 is engaged with notch 48, key 44 is removed, thereby locking nut 18 onto bolt 14. If it is desired to disassemble flanges 11 and 12, key 44 is simply inserted into keyhole 46 and screw 40 is rotated to remove pick-resistant lock 36. After pick-resistant lock 36 has been removed, bar 34 is removed and nut 18 is backed-off with a conventional wrench.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features, all as would be apparent to one skilled in the art after having the benefit of this description of the invention.

What is claimed is:

1. A security device, which comprises:

a cylindrical bolt having formed therein a radial first hole substantially perpendicular to the axis of said bolt, a threaded second hole formed coaxial with said bolt and intersecting said first hole, and a third hole formed coaxial with said second hole and connecting said second hole with the end of said bolt, said third hole having a flat side;

a nut threadably engageable with said bolt;

a bar insertable into said first hole, said bar having a length long enough such that an end thereof extends radially outside said bolt when said bar is inserted in said first hole, said bar having a notch therein alignable with said second hole when said bar is inserted in said first hole;

and a key-operable pick-resistant lock including a lock body conformed to fit said third hole and a key-operable screw engageable with said second hole, said screw including key-releasable lock structures and being adapted to screw into said second hole to engage said notch of said bar.

* * * * *